United States Patent
Belloir et al.

(10) Patent No.: US 8,627,840 B2
(45) Date of Patent: *Jan. 14, 2014

(54) PIPES FOR TRANSPORTING WATER CONTAINING CHLORAMINE

(75) Inventors: Pierre Belloir, Braine-L'alleud (BE); Christine Bertrand, Chaumont-Gistoux (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 255 days.

This patent is subject to a terminal disclaimer.

(21) Appl. No.: 12/677,365

(22) PCT Filed: Sep. 2, 2008

(86) PCT No.: PCT/EP2008/061539
§ 371 (c)(1), (2), (4) Date: Aug. 11, 2010

(87) PCT Pub. No.: WO2009/037103
PCT Pub. Date: Mar. 26, 2009

(65) Prior Publication Data
US 2010/0307597 A1 Dec. 9, 2010

(30) Foreign Application Priority Data

Sep. 21, 2007 (EP) .................... 07116898
Nov. 29, 2007 (EP) .................... 07121863

(51) Int. Cl.
| *F16L 9/12* | (2006.01) |
| *C02F 1/76* | (2006.01) |
| *C08F 10/02* | (2006.01) |
| *C08L 23/04* | (2006.01) |

(52) U.S. Cl.
USPC ........... 137/1; 138/140; 428/36.9; 428/36.91; 525/240; 526/65

(58) Field of Classification Search
USPC ........... 526/65; 525/240; 428/35.7, 523, 36.9, 428/36.91; 137/1; 138/140; 422/37
See application file for complete search history.

(56) References Cited

U.S. PATENT DOCUMENTS

| 6,346,575 | B1 * | 2/2002 | Debras et al. ........... 525/191 |
| 2004/0266966 | A1 * | 12/2004 | Schramm et al. ......... 526/352 |
| 2005/0228139 | A1 | 10/2005 | Lee |
| 2008/0293042 | A1 * | 11/2008 | Cooper ........... 435/5 |

FOREIGN PATENT DOCUMENTS

| EP | 1650230 | 4/2006 |
| JP | 2004-217802 | * 8/2004 |

OTHER PUBLICATIONS

Machine translation of JP 2004-217802; published Aug. 2004.*
Chen Weiyu, The Research About Optimizing Water Quality Inside Drinking Water Supply System, Environmental Science and Management, vol. 32, No. 2, Feb. 2007, pp. 77-79.
Chinese Office Action issued in Chinese Application No. 200880108209.2 issued on Jul. 3, 2012, and English translation thereof (10 pages).

* cited by examiner

*Primary Examiner* — Fred M Teskin

(57) ABSTRACT

This invention is related to the preparation of polyethylene pipe resins suitable for transporting hot and cold water containing chloramine.

15 Claims, No Drawings

PIPES FOR TRANSPORTING WATER CONTAINING CHLORAMINE

CROSS-REFERENCE TO RELATED APPLICATIONS

This application claims the benefit of PCT/EP2008/061539, filed Sep. 2, 2008, which claims priority from EP 07116898.3, filed Sep. 21, 2007 and EP 07121863.0, filed Nov. 29, 2007.

This invention is related to the preparation of polyethylene pipe resins suitable for transporting cold and/or hot water containing chloramine.

Polymer materials are frequently used for preparing pipes that are suitable for transporting fluid such as liquid or gas. The fluid may be pressurised and its temperature may range between 0 and 90° C. These pipes were usually prepared from medium or high density monomodal or multimodal polyethylene.

For example, WO00/01765 discloses the use of a multimodal polyethylene resin having a density of 0.930 to 0.965 g/cc and a MI5 of from 0.2 to 1.2 dg/min for transporting cold, pressurised water.

The transport of hot water requires other types of resin than conventional polyethylene as the service life of a typical polyethylene pipe decreases by about 50% when the temperature of the transported fluid increases by 10° C. and as it is subject to stress cracking at elevated temperature.

Several multimodal polyethylene resins were disclosed for the transport of hot fluid. For example, EP-A-1448702 discloses a polyethylene resin useful for the preparation of hot water pipes. That polyethylene resin is multimodal with a high molecular weight fraction having a density of at least 0.920 g/cc and a low molecular weight fraction. Its density ranges between 0.921 and 0.950 g/cc. Its time to failure at a temperature of 95° C. and at a pressure of 3.6 MPa is of at least 165 h and its modulus of elasticity is of at most 900 MPa.

EP-A-1425344 also discloses a multimodal polyethylene resin that can be used for hot water pipes. It has a density of from 0.925 to 0.950 g/cc and a MI2 of from 0.1 to 5 dg/min. It comprises a high molecular weight fraction having a density of from 0.910 to 0.935 g/cc and a MI2 of at most 1 dg/min and a low molecular weight fraction having a density of from 0.945 to 0.965 g/cc and a MI2 of from 2 to 200 dg/min.

Water for domestic use also transports disinfectants such as for example chlorine dioxide. The service life of pipes prepared from the prior art polyethylene resins was substantially decreased by the addition of chloramine.

Cross-linked polyethylene resins have also been used to improve the performances of the pipes. The cross linking was achieved either chemically with silanes or peroxides or physically by irradiation.

WO2005/056657 discloses the use of a high density polyethylene resin comprising a combination of at least two antioxidant additives to prepare pipes for transporting water containing chlorine.

There is thus a need for polyethylene pipes that are able to transport hot or cold water containing such aggressive chemical compound that do not require the addition of specific combinations of antioxidants.

It is an aim of the present invention to prepare polyethylene pipe resins suitable for transporting hot or cold water containing chloramine.

It is also an aim of the present invention to prepare polyethylene pipe resins that have good mechanical properties.

It is another aim of the present invention, to prepare polyethylene pipe resins that can be processed easily.

Any one of these aims is at least partially fulfilled by the present invention.

Accordingly, the present invention discloses the use for transporting water containing chloramine of a pipe characterised in that is prepared from a polyethylene resin produced by one or more single site catalyst systems.

The pipe of the present invention is preferably prepared from a bi- or multi-modal polyethylene resin produced either by two or more single site catalyst systems in a single reactor or by a single site catalyst system in two serially connected reactors, wherein at least one of the single site catalyst systems is a metallocene catalyst system comprising a bisindenyl or a bis tetrahydroindenyl catalyst component of formula $R''(Ind)_2MQ_2$ wherein Ind is a substituted or unsubstituted indenyl or tetrahydroindenyl group, R" is a structural bridge imparting stereorigidity to the complex, M is a metal Group 4 of the Periodic Table and Q is a hydrocarbyl having from 1 to 20 carbon atom or a halogen.

The one or more single site catalyst systems are preferably metallocene catalyst systems and more preferably comprise a bridged bis-indenyl or bistetrahydro-indenyl catalyst component described by general formula

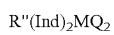

wherein Ind is a substituted or unsubstituted indenyl or tetrahydroindenyl group, R" is a structural bridge imparting stereorigidity to the complex, M is a metal Group 4 of the Periodic Table and Q is a hydrocarbyl having from 1 to 20 carbon atom or a halogen.

If Ind is an indenyl group it is preferably unsubstituted or substituted at position 4 with a bulky substituent and at position 2 with a small substituent. A bulky substituent is at least as bulky as t-butyl. A small substituent is preferably methyl.

If Ind is a tetrahydroindenyl group, it is preferably unsubstituted.

M is preferably Ti or Zr, more preferably Zr.

Each Q is preferably selected from aryl, alkyl, alkenyl, alkylaryl or arylalkyl having at most 6 carbon atoms, or halogen. More preferably both Q are the same and are chlorine.

Structural bridge R" is selected from $C_1$-$C_4$ alkylene radical, a dialkyl germanium or silicon or siloxane, or an alkyl phosphine or amine radical, which bridge is substituted or unsubstituted. Preferably it is ethylene, isopropylidene, dimethylsilyl or diphenyl.

The most preferred catalyst component is ethylene bistetrahydroindenyl zirconium dichloride. The metallocene catalyst component used in the present invention can be prepared by any known method. A preferred preparation method is described in J. Organomet. Chem. 288, 63-67 (1985).

The catalyst system also comprises an activating agent having an ionising action and optionally an inert support. The activating agent is preferably selected from aluminoxane or boron-containing compound and the inert support is preferably selected from mineral oxide, more preferably, silica. Alternatively, the activating agent is a fluorinated activating support.

The polyethylene resin that can be used in the present invention is either monomodal or bi- or multi-modal and is prepared by any method known in the art, with the restriction that the catalyst system comprises at least one single site component. Its density preferably ranges from 0.915 to 0.965 g/cc.

In a more preferred embodiment according to the present invention the polyethylene resin is a bi- or multi-modal resin prepared in two or more serially connected loop reactors. It comprises a high molecular weight (HMW), low density fraction and a low molecular weight (LMW), high density fraction.

The high molecular weight, low density fraction has a density of at least 0.908 g/cc, preferably of at least 0.912 g/cc and of at most 0.928 g/cc, more preferably of at most 0.926 g/cc. Most preferably it is of about 0.922 g/cc. It has a high load melt index HLMI of at least 2 dg/min, more preferably of at least 5 dg/min and most preferably of at least 7 dg/min and of at most 12 dg/min, more preferably of at most 10 dg/min. Most preferably, it is of 8 to 9 dg/min. The melt index MI2 is of from 0.05 to 2 dg/min, more preferably of from 0.1 to 0.5 dg/min and most preferably of about 0.2 dg/min.

The low molecular weight, high density fraction has a density of at least 0.930 g/cc, more preferably of at least 0.940 g/cc, and of at most 0.975 g/cm$^3$, more preferably of at most 0.962 g/cc. Most preferably it is of about 0.945 to 0.955 g/cc. It has a melt index MI2 of at least 0.5 dg/min, more preferably of at least 1 dg/min, and of at most 10 dg/min, more preferably of at most 6 dg/min. Most preferably, it is of from 2 to 3 dg/min.

The final resin comprises 50 to 60 wt % of HMW fraction, preferably from 50 to 55 wt %, more preferably from 52 to 53 wt % and from 40 to 50 wt % of LMW fraction, preferably from 45 to 50 wt % and most preferably from 47 to 48 wt %. It has a broad or multimodal molecular weight distribution of from 2 to 5, a density of from 0.930 to 0.949 g/cc and a melt index MI2 of from 0.3 to 1 dg/min. The most preferred polyethylene resin according to the present invention has a density of about 0.935 g/cc, a melt index MI2 of 0.6 dg/min and a polydispersity of about 3.

The molecular weight distribution is fully described by the polydispersity index D defined by the ratio Mw/Mn of the weight average molecular weight Mw to the number average molecular weight Mn as determined by gel permeation chromatography (GPC).

The density is measured according to the method of standard test ASTM 1505 at a temperature of 23° C. The melt index and high load melt indices are measured by the method of standard test ASTM D 1238 respectively under a load of 2.16 kg and 21.6 kg and at a temperature of 190° C.

The polyethylene resins according to the invention can be prepared by any method suitable therefore. They can be prepared by physically blending the high density and the low density polyethylene fractions, prepared separately, or they can be prepared by polymerising ethylene in the presence of a mixture of catalysts. Preferably, the high density and low density fractions are produced in two serially connected loop reactors with the same catalyst system. In such a case, the LMW, high density fraction is preferably prepared in the first reactor, so that the HMW, low density fraction is prepared in the presence of the high density fraction. Preferably, the same catalyst system is used in both steps of the cascade polymerisation process to produce a chemical blend of the high and low molecular weight fractions. The catalyst system may be employed in a solution polymerisation process, which is homogeneous, or in a slurry process, which is heterogeneous or in a gas phase process. Preferably a slurry process is used. The most preferred polymerisation process is carried out in two serially connected slurry loop reactors.

In a preferred arrangement, the product of a first cascade reaction zone, including the olefin monomer, is contacted with the second co-reactant and the catalyst system in a second cascade reaction zone to produce and mix the second polyolefin with the first polyolefin in the second reaction zone. The first and second reaction zones are conveniently interconnected reactors such as interconnected loop reactors.

It is also possible to introduce into the second reaction zone fresh olefin monomer as well as the product of the first reaction zone.

Because the second polyolefin is produced in the presence of the first polyolefin a multimodal or at least bimodal molecular weight distribution is obtained.

In one embodiment of the invention, the first co-reactant is hydrogen, to produce the LMW fraction and the second co-reactant is the comonomer to produce the HMW fraction. Typical comonomers include hexene, butene, octene or methylpentene, preferably hexene.

In an alternative embodiment, the first co-reactant is the comonomer, preferably hexene. Because the metallocene catalyst components of the present invention exhibit good comonomer response as well as good hydrogen response, substantially all of the comonomer is consumed in the first reaction zone in this embodiment. Homopolymerisation takes place in the second reaction zone with little or no interference from the comonomer.

The temperature of each reactor may be in the range of from 60° C. to 110° C., preferably from 70° C. to 90° C.

The present invention further provides the use of such a polyethylene resin for the manufacture of pipes for cold or hot water, especially for hot water containing chloramine.

The polyethylene resins according to the invention, having such a specific composition, molecular weight and density, can lead to a marked improvement of the processing properties when the resin is used as a pipe resin, while conserving or improving mechanical behaviour as compared to known pipe resins.

In particular, the polyethylene resins in accordance with the invention have impact resistance and slow crack resistance at least equivalent, often higher than current available pipe resins.

The resins of the invention are endowed with excellent rheological behaviour.

The resin in accordance with the invention is characterised by a high shear-thinning behaviour. This means good injection-moulding capability for the resins when used to produce injection-moulded pipes and pipe fittings.

Generally, the pipes are manufactured by extrusion or by injection moulding, preferably by extrusion in an extruder. The pipes made of the multimodal polyethylene resin according to the present invention may be single layer pipes or be part of multilayer pipes that include further layers of other resins.

In another embodiment according to the present invention, the pipe is a multilayer pipe comprising at least one layer of polyethylene pipe resin prepared by any method known in the art and at least one other layer of polyethylene resin prepared with a single site catalyst system, wherein said other polyethylene resin may or may not be a pipe resin.

The pipe resin may also be compounded, for example with black or blue pigments.

The pipes of the present invention offer an excellent resistance to corrosion when used for transporting hot or cold water containing chloramine. The water temperature ranges from 0 to 90° C. and the amount of chlorine dioxide in the water is of from the smallest detectable amount, typically of from 0.1 mg/L, up to the existing upper tolerance of 4 mg per liter of water, typically it is of 0.3 to 0.6 mg/L. It must be noted that the pipes according to the present invention could sustain higher percentage of chlorine dioxide than the upper limit of 4 mg/L tolerated for domestic water.

EXAMPLES

Three different resins have been formed into pipes that were tested for transporting water containing chloramine.

Resin R1, according to the present invention, was prepared with ethylene bistetrahydroindenyl zirconium dichloride catalyst component in a double slurry loop reactor. The density was of 0.935 g/cc and the melt flow rate MI2 was of 0.7 dg/min.

It was additivated with black pigment resulting in a density of 0.945 g/cc.

Resin R2 is a commercial resin sold by Total Petrochemicals under the name XS10B.

It was prepared with a Ziegler-Natta catalyst system.

Resin R3 is a commercial resin sold by Total Petrochemicals under the name 3802B.

It was prepared with a chromium-based catalyst system.

Resins R2 and R3 were also additivated with the same amount of black pigments as resin R1.

These pipes were tested following the standard procedures of JANALAB under the following conditions:
pH: 6.8
chloramine: 4 ppm
fluid temperature: 80° C.
stress: 1.9 MPa
flow rate: 0.1 USGPM The results of time to failure are summarised in Table I

TABLE I

| Resin | Average time to failure (h) |
|---|---|
| R1 | >10000 |
| R2 | 7500 |
| R3 | 3500 |

As can be seen from Table I the resin according to the present invention resists for a longer time than those prepared with Ziegler-Natta or chromium catalyst systems.

The invention claimed is:

1. A method of transporting water containing chloramine through a pipe, wherein the pipe is formed from a bi- or multi-modal polyethylene resin comprising:
   a high molecular weight (HMW), low density fraction; and
   a low molecular weight (LMW), high density fraction;
   wherein the HMW, low density fraction and the LMW, high density fraction are produced either with two or more single site catalyst systems in a single reactor or with a single site catalyst system in two serially connected reactors;
   wherein at least one of the single site catalyst systems is a metallocene catalyst system comprising a bisindenyl or a bis tetrahydroindenyl catalyst component of formula R"(Ind)$_2$MQ$_2$; and
   wherein Ind is a substituted or unsubstituted indenyl or tetrahydroindenyl group, R" is a structural bridge imparting stereorigidity to the complex, M is a metal Group 4 of the Periodic Table and Q is a hydrocarbyl having from 1 to 20 carbon atom or a halogen.

2. The method of claim 1, wherein the bi- or multi-modal polyethylene resin has a density of from 0.915 to 0.965 g/cc.

3. The method of claim 1, wherein the bi- or multi-modal polyethylene resin is prepared by physical blending.

4. The method of claim 1, wherein the bi- or multi-modal polyethylene resin is prepared by chemical blending in a solution polymerisation process, slurry polymerisation process or a gas phase process.

5. The method of claim 4, wherein the bi- or multi-modal polyethylene resin is prepared in two or more serially connected slurry loop reactors.

6. The method of claim 1, wherein the bi- or multi-modal polyethylene resin has a density of from 0.930 to 0.949 g/cc and a melt index MI$_2$ of from 0.3 to 1 dg/min;
   wherein the HMW, low density fraction has a density of from 0.908 to 0.928 g/cc and a high load melt index HLMI of from 2 to 12 dg/min; and
   wherein the LMW, high density fraction has a density of from 0.930 to 0.975 g/cc and a melt index MI$_2$ of from 0.5 to 10 dg/min.

7. The method of claim 1, wherein the bi- or multi-modal polyethylene resin comprises from 50 to 60 wt. % of the HMW, low density fraction and 40 to 50 wt. % of the LMW, high density fraction.

8. The method of claim 1, wherein the pipe is a single layer pipe.

9. The method of claim 1, wherein the pipe is a multi layer pipe, and wherein at least one of the layers is prepared with the bi- or multi-modal polyethylene resin.

10. The method of claim 1, wherein the amount of chloramine is from a smallest detectable amount up to an existing upper tolerance of 4 mg per liter of water.

11. The method of claim 1, wherein the water temperature is of from 0 to 90° C.

12. The method of claim 1, wherein the LMW, high density fraction is prepared in a first reactor and the HMW, low density fraction is prepared in the presence of the LMW, high density fraction.

13. The method of claim 1, wherein the HMW, low density fraction and the LMW, high density fraction are produced in two serially connected loop reactors with the same catalyst system.

14. The method of claim 1, wherein the two or more single site catalyst systems are each metallocene catalyst systems, or wherein the single site catalyst system is a metallocene catalyst system.

15. A method of transporting water containing chloramine through a pipe, wherein the pipe is formed from a bi- or multi-modal polyethylene resin comprising:
   a high molecular weight (HMW), low density fraction; and
   a low molecular weight (LMW), high density fraction;
   wherein the HMW, low density fraction and the LMW, high density fraction are produced either with two or more single site catalyst systems in a single reactor or with a single site catalyst system in two serially connected reactors; and
   wherein at least one of the single site catalyst systems is a metallocene catalyst system.

* * * * *